UNITED STATES PATENT OFFICE.

WILHELM HEUSSLER, OF NEW YORK, N. Y.

CANDY.

SPECIFICATION forming part of Letters Patent No. 265,805, dated October 10, 1882.

Application filed September 6, 1882. (No specimens.)

*To all whom it may concern:*

Be it known that I, WILHELM HEUSSLER, of the city, county, and State of New York, have invented a new and Improved Candy, of which the following is a full, clear, and exact description.

The object of my invention is to provide a new and improved saccharine compound or candy, which has a very pleasant taste, is wholesome, and can be made very readily.

In carrying out my invention I mix one pound of sugar, one pound of shelled filberts, and one pound of shelled almonds, and then melt the sugar and thoroughly mix it with the nuts. The mass of nuts and molten sugar is then spread on a marble slab and when cold is hard and brittle. The hardened mass is then reduced to a coarse pulverized or granular condition. I then melt one pound of sugar and add a pint of pure cream, and heat this mixture until it becomes thick or viscous enough to draw threads, and then I mix the above-mentioned granulated nut and sugar mass with the thickened mixture of sugar and cream and obtain a stiff dough, which is preferably flavored with vanilla, but can be flavored with any other flavoring extract. Small lumps, pellets, or balls are formed out of the said dough, and are then covered with sugar, chocolate, or other suitable material in the usual manner, and are then permitted to dry. The dough mass always remains soft.

The coating may have any desired flavor or color. In place of the almonds and filberts, other nuts may be used; but I prefer to use almonds and filberts as they are not as oily as most nuts are and have a much finer flavor and taste. The cream that has been mixed with the sugar prevents the dough from hardening within its coating.

Having thus fully described my invention, I claim as new and desire to secure by Letters Patent—

1. The herein-described saccharine composition or candy, consisting of nuts, sugar, and cream, about in the proportions stated.

2. The method of making candy herein described, consisting in melting nuts and sugar together, hardening, and then pulverizing the mass, and mixing it with sugar and cream that have been boiled together, whereby a dough is formed from which the candies or pellets are made, as set forth.

3. The improvement in the art of making candy herein described, consisting in mixing pulverized-sugared nuts with a boiled mixture of cream and sugar to form a dough which does not harden, as set forth.

WILHELM HEUSSLER.

Witnesses:
OSCAR F. GUNZ,
C. SEDGWICK.